United States Patent
Rajendran et al.

(10) Patent No.: US 10,284,271 B1
(45) Date of Patent: May 7, 2019

(54) METHOD, SYSTEM AND DEVICE FOR PROVIDING PHASE SHIFTED SIGNALS TO AN ARRAY OF ANTENNAS FOR BEAM STEERING

(71) Applicant: Steradian Semiconductors Private Limited, Bangalore (IN)

(72) Inventors: Gireesh Rajendran, Bangalore (IN); Rakesh Kumar, Bangalore (IN)

(73) Assignee: Steradian Semiconductors Private Limited, Bangalore (IN)

( * ) Notice: Subject to any disclaimer, the term of this patent is extended or adjusted under 35 U.S.C. 154(b) by 0 days.

(21) Appl. No.: 15/996,537

(22) Filed: Jun. 4, 2018

(30) Foreign Application Priority Data

Mar. 31, 2018 (IN) .............................. 201841012226

(51) Int. Cl.
 *H04B 7/06* (2006.01)
(52) U.S. Cl.
 CPC ................................. *H04B 7/0617* (2013.01)

(58) Field of Classification Search
 CPC .................................................... H04B 7/0617
 USPC ......................................................... 375/299
 See application file for complete search history.

(56) References Cited

U.S. PATENT DOCUMENTS

| | | | |
|---|---|---|---|
| 2004/0063467 A1* | 4/2004 | Shapira | H01Q 3/26 455/561 |
| 2015/0346340 A1* | 12/2015 | Yaacobi | G01S 17/36 356/5.11 |

* cited by examiner

*Primary Examiner* — Michael R Neff

(57) ABSTRACT

A beam steering device comprising a set of phase shifters, each providing substantially same phase shift, connected such that output of one phase shifter feeds the input of other, in that a signal is cascaded through the set of phase shifters to generate a corresponding set of phase shifted signals, and an array of antennas forming the RF radiation beam. The set of phase shifted signals are coupled to the respective one of antenna in the array of antennas so as to steer the RF radiation beam in accordance with the phase shift. The device further comprises a set of mixer to translate the first set of phase shifted signals to a RF canter frequency.

7 Claims, 4 Drawing Sheets

METHOD, SYSTEM AND DEVICE FOR PROVIDING PHASE SHIFTED SIGNALS TO AN ARRAY OF ANTENNAS FOR BEAM STEERING

CROSS REFERENCES TO RELATED APPLICATIONS

This application claims priority from Indian patent application No. 201841012226 filed on Mar. 31, 2018 which is incorporated herein in its entirety by reference.

BACKGROUND

Field of Invention

Embodiments of the present disclosure relate generally to signal processing and more specifically to method, system and device for providing phase shifted signals to an array of antennas for beam steering.

Related Art

Radio Frequency (RF) signals are transmitted using RF antennas. However, when an RF signal is transmitted by an antenna, the transmitted RF signal power is spread in all the direction thereby limiting its performance in some application. As is well known in the art, to confine transmitted RF signal power to any desired direction, in other words, to form a desired beam pattern of the transmitted RF signal power (to obtain a gain in particular direction), multiple RF antennas arranged in specific pattern (antenna array) are employed that transmit the same RF signal.

In some applications such as object detection, obstacle detection, vehicle navigation, drones, radar range detection etc., the direction or the angle of the beam formed by the antenna array is dynamically changed to scan a specific area or zone. The range over which the angle of the beam is changed to cover the desired zone is referred to as field of view/vision (FOV). In order to set the beam to a desired angle, each antenna in the antenna array is provided with the RF signal relatively shifted in phase with respect to that of its adjacent antenna in the order of transmission. The magnitude of the phase shift therefore determines the angle of the beam. Accordingly, number of phase shifted versions of the RF signal are generated and provided to the respective antenna in the antenna array.

FIG. 1 illustrates a conventional system for generating the number of phase shifted versions of the RF signals. As shown there, the phase shifters 110A-110N provides desired phase shift to a base band signal 101 desired to be transmitted over the antenna array 140A-140N. The phase shifted versions of the base band signals 112A-112N are provided to the digital to analog converter (DAC) 120A-120N that converts digital phase shifted base band signals 112A-112N to analog phase shifted baseband signals 123A-123N. The mixers 130A-130N translates each phase shifted analog base band signals 123A-123N to the number of phase shifted versions of RF signals 134A-134N and that are fed to the corresponding number of antennas 140A-140N to effectively set the beam to the desired angle corresponding to the phase shift. Though this conventional technique provides resolution as the phase shifters are implemented in the digital domain, such system suffers from at least very high cost due to the hardware intensive architecture with dedicated DAC, filter and mixer per antenna.

FIG. 2 illustrates another conventional system for generating the number of phase shifted versions of the RF signals. As shown there, the DAC 210 converts the digital base band signal to analog base band signal. The mixer 220 transforms the analog base band signal to the higher RF signal for transmission. The phase shifters 230A-230N provides desired phase shift to the RF signal and generates N number of Phase shifted version of the RF signal, that are then provided to antenna array 240A-240N respectively to achieve desired beam angle. This conventional technique suffers from the low resolution and also since the Phase shifters are implemented in the RF frequency range, the loss and power consumption limits its application.

SUMMARY

According to an aspect, a beam steering device comprises a set of phase shifters, each providing substantially same phase shift, connected such that output of one phase shifter feeds the input of other, in that a signal is cascaded through the set of phase shifters to generate a corresponding set of phase shifted signals, and an array of antennas forming the RF radiation beam. The set of phase shifted signals are coupled to the respective one of antenna in the array of antennas so as to steer the RF radiation beam in accordance with the phase shift. The device further comprises a set of mixer to translate the first set of phase shifted signals to a RF canter frequency.

According to another aspect, the beam steering device further comprises a set of multiplier multiplies the corresponding ones of the set of phase shifted signals by a factor to generate a set of phase shifted RF signals. Further a set of mixer mixes a first base band signal carrying an information with each in the set of phase shifted RF signals to form a another set of phase shifted RF signals carrying the information.

According to another aspect, when a distance between the antennas in the antenna array is uniform, the phase shift is set to a value $\phi$ equal to $(2\pi/\lambda)*d*\sin(\theta)$, in that $\theta$ representing an angle made by the RF radiation beam, d representing a uniform distance between the antennas in the array, $\lambda$ representing the wavelength of the set of phase shifted signal. On the other hand, when the distance between the antenna array is non uniform, the phase shift is set to a value $\phi$ equal to $(2\pi/\lambda)*(d+\Delta)*\sin(\theta)$, $d+\Delta$ representing a non-uniform distance between the antennas in the antenna array.

Several aspects are described below, with reference to diagrams. It should be understood that numerous specific details, relationships, and methods are set forth to provide a full understanding of the present disclosure. One who skilled in the relevant art, however, will readily recognize that the present disclosure can be practiced without one or more of the specific details, or with other methods, etc. In other instances, well-known structures or operations are not shown in detail to avoid obscuring the features of the present disclosure.

DETAILED DESCRIPTION OF THE PREFERRED EXAMPLES

Figure 1:
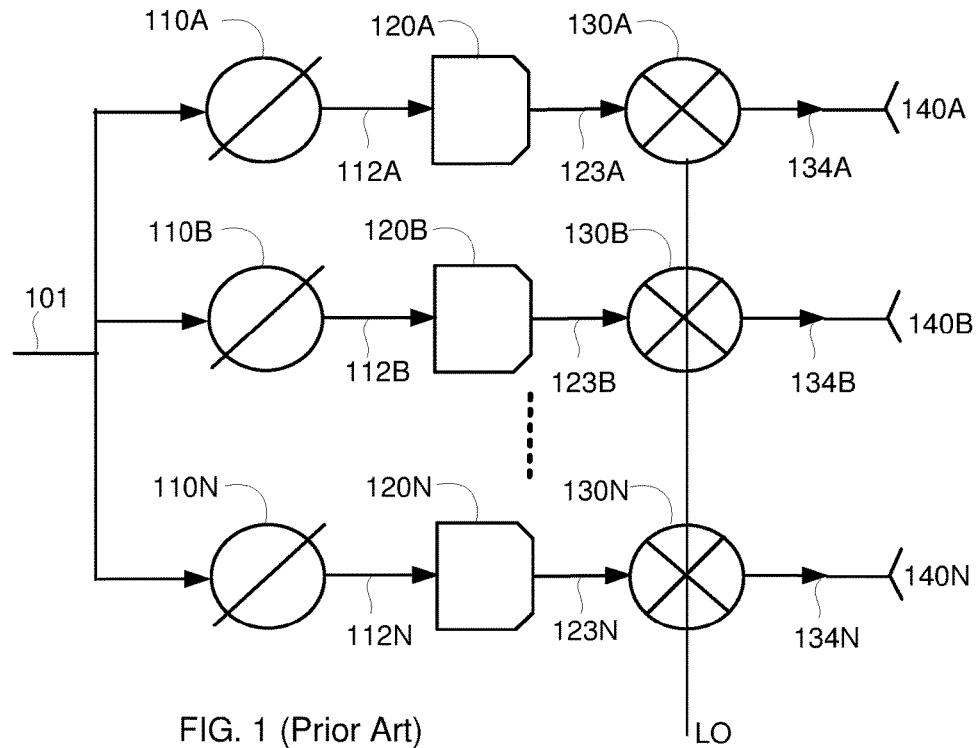
FIG. 1 illustrates a conventional system for generating the number of phase shifted versions of the RF signals.
Figure 2:
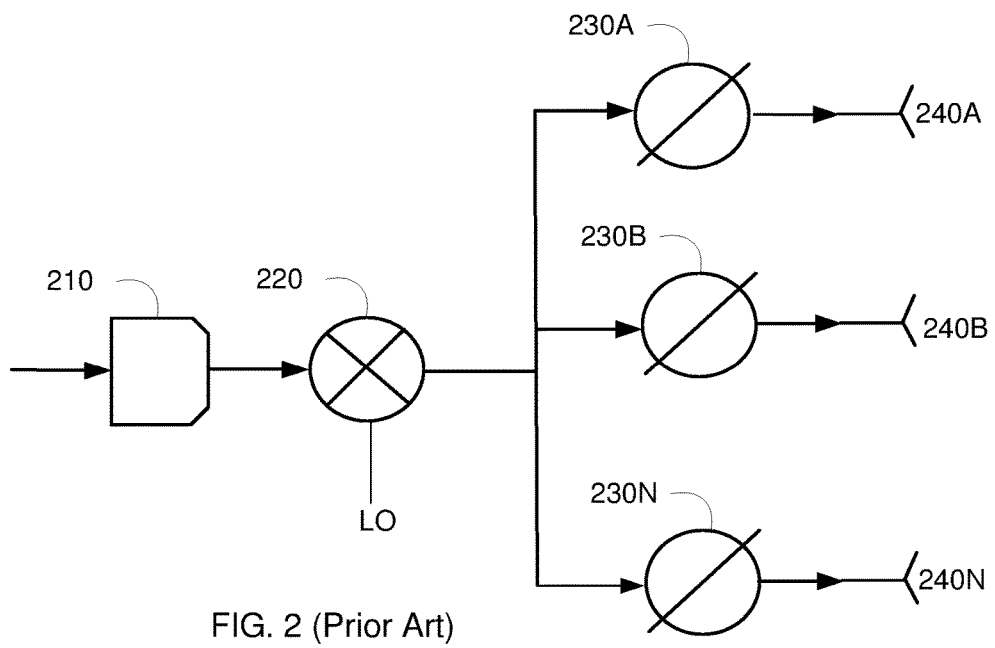
FIG. 2 illustrates another conventional system for generating the number of phase shifted versions of the RF signals.
Figure 3A:
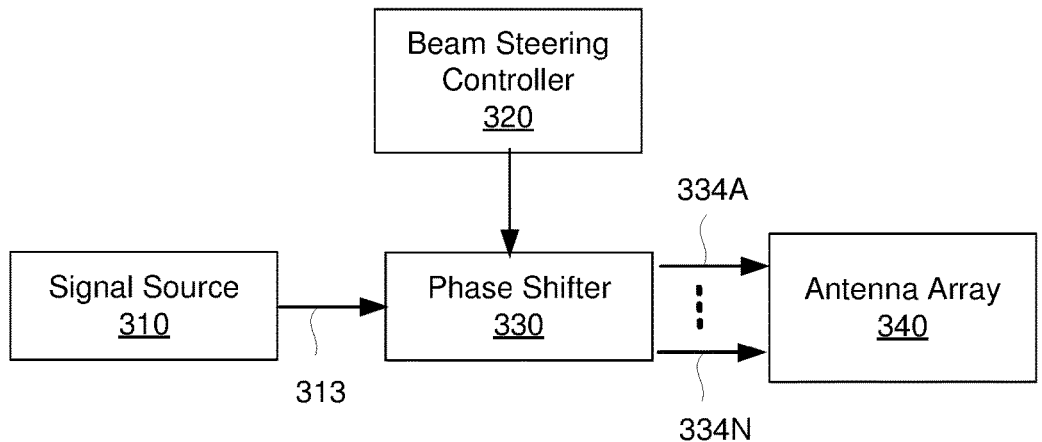
FIG. 3A is a block diagram of a system providing phase shifted signals to an array of antennas in one embodiment.

FIG. 3A is a block diagram of a system providing phase shifted signals to an array of antennas in one embodiment. The system is shown comprising signal source 310, beam steering controller 320, phase shifter 330, and antenna array 340. Each element is described in further detail below.

The signal source 310 provides signal desired to be transmitted on the antenna array 340. The signal source may comprise a sequence of known signal pattern often referred to as signature pattern as sequence of digital bits. Alternatively, the signal source 310 may be any radar signature signal for detection of the object. The signal source 310 may comprise a circuitry that generates a pseudo sequence that is unique and having correlation property for detection. The signal source 310 may comprise external devices, memory, media files containing the information desired to be transmitted over the antenna array 340. The signal source 310 may also comprise a signal processing circuitry that may perform basic signal processing like block coding, error control coding, preamble insertion, modulation, etc., for example. Accordingly, the signal source may provide the signal so processed on the path 313.

The antenna array 340 comprises plurality of antenna elements that transmit the signal received on the respective feed line 334A-334N. The antennas in the array 340 may be arranged linearly or in a two-dimensional matrix form. In one embodiment, the antennas are formed on a semiconductor substrate as part of an integrated circuit.

Figure 3B:
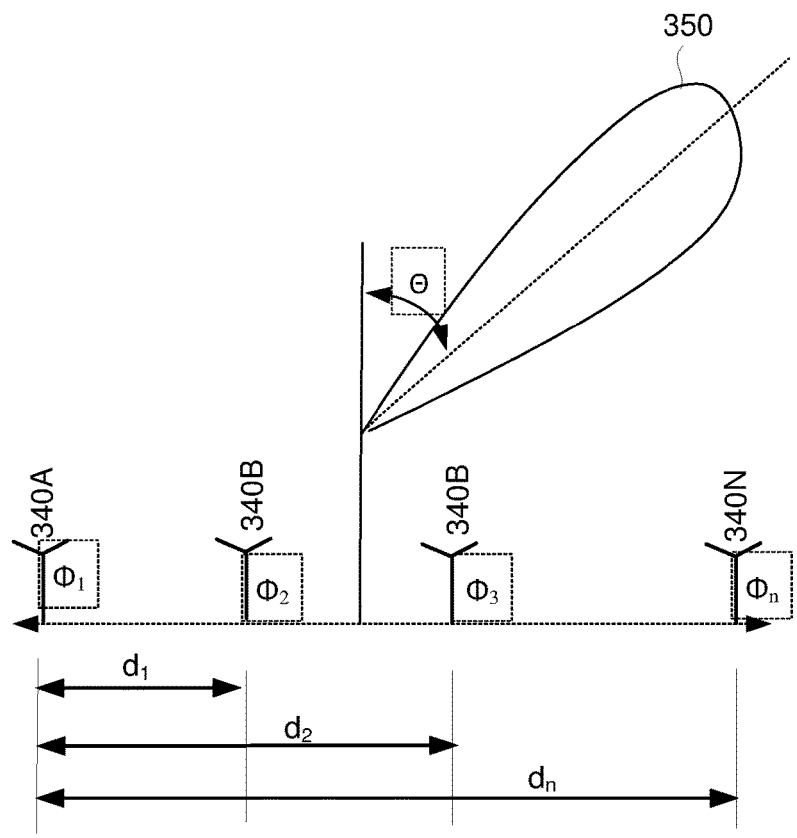
FIG. 3B illustrates an example linear arrangement of antenna array 340A-340N and example beam formed by the antenna array.

FIG. 3B illustrates an example linear arrangement of antenna array 340A-340N and example beam formed by the antenna array. As shown there the antennas 340A through 340N are respectively spaced at a relative distance $d_1$, $d_2$, $d_3$, $d_4$, ... $d_{N-1}$ from the first antenna 340A. The beam 350 is formed by the antenna array 340A-340N. The beam is shown making an angle $\theta$ with respect to the normal of the plane 360 on which the antenna are formed. The width of the beam is inversely proportional to the number of antennas in the array (1/N). The phase angles $\phi_1$, $\phi_2$, $\phi_3$, ... $\phi_n$ represent the phase at which the signal is fed to the respective antenna to cause beam angle $\theta$. The phase angles $\phi_1$, $\phi_2$, $\phi_3$, ... $\phi_n$ may be determined in relation with the distance $d_1$, $d_2$, $d_3$, $d_4$, ... $d_{N1}$, and beam angle $\theta$ as: Phase angle $\phi_{k}=(2\pi/\lambda)*d_k*\sin(\theta)$. in that the $\phi_k$ represents the phase angle to the kth antenna, $\lambda$ representing the wavelength of the signal transmitted on the antenna, $d_k$ representing the distance of the Kth antenna element from the first antenna (340A, for example). As may be appreciated, the signal needs to be shifted by different angles (modulus of 360) forming a phase shift range of 360 degrees for a phase shifter. When the number of antenna N increases, the resolution of the phase shifter also required to beat at least 360/N.

Conventionally, a four bits phase shifter provides a resolution of 360 degree/16 and a five bits phase shifter may provide a resolution of 360 degrees/32. Thus, as number of antennas increases (making beam width smaller) conventional phase shifter may suffer from lack of resolution.

Continuing with reference to FIG. 3A, the beam steering controller 320 provides a beam angle $\theta$ at which the beam 350 is required to be set. The beam steering controller 320 may vary the angle from $\theta$ from an initial value $\theta_i$ to a final value $\theta_f$ in steps angel $\phi$. The difference between the initial value $\theta_i$ and the final value $\theta_f$ ($\theta_f-\theta_i$) is referred to as field of vision or FoV. The steps angel $\phi$ is referred to as resolution of the beam steering. Accordingly, the beam steering controller may provide different beam angle $\theta$ at different time to cause the beam 350 to move from initial position to final position (over FoV).

The phase shifter 330 generates N versions of signal 312 that are phase shifted by corresponding N different angles. For example, with respect to FIG. 3B the phase shifter 330 may generate signals 334A-334N (N versions of signal 313) to respectively to feed to antennas 340A-340N with the phase angles $\phi_1$, $\phi_2$, $\phi_3$, ... $\phi_n$. The phase shifter 330 may receive signal 313 in the base band and provide the multiple phase shifted signals 334A-334N in the RF band. The manner in which the phase shifter 330 may be implemented in an embodiment is further described below.

Figure 4:
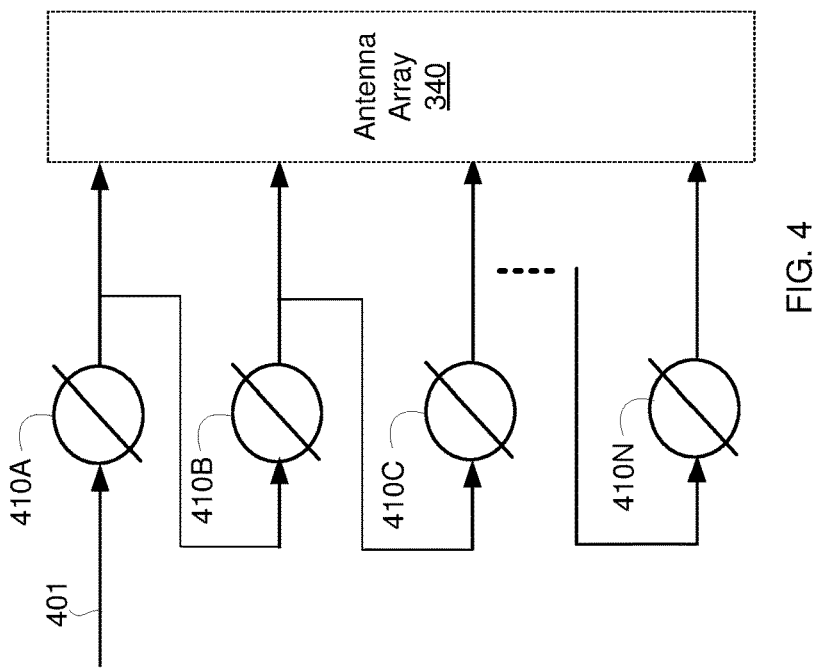
FIG. 4 is a block diagram illustrating the phase shifter implementation in one embodiment.

FIG. 4 is a block diagram illustrating the phase shifter implementation in one embodiment. The block diagram is shown comprising phase shifters 410A through 410N. The signal 401 represents a signal required to be transmitted on the antenna array 340. The phase shifter 410A-410N respectively provides phase shifted versions of the signal 401 shifted by angle $\phi_1$, $\phi_2$, $\phi_3$ ... $\phi_n$.

The phase shifters 410A-410N are shown connected in cascading manner. That is, output of the phase shifter 410A is provided to the input of the phase shifter 410B and so on. As a result, phase shifter 410B operates to provide a phase shift of $\phi_2-\phi_1$ as against operating to provide a phase shift of $\phi_2$. Similarly, the phase shifter 440C operates to provide a phase shift of $\phi_3-\phi_2$ as against operating to provide a phase shift of $\phi_3$. Thus, any kth phase shifter operates to phase shift a signal by an angle $\phi_k-\phi_{k-1}$. To provide a beam angle $\theta$, $\phi_k$ and $\phi_{k-1}$ may be set to: $\phi_k=(2\pi/\lambda)*d_k*\sin(\theta)$ and $\phi_{k-1}=(2\pi/\lambda)*d_{k-1}*\sin(\theta)$.

Thus, the kth phase shifter operate to phase shift by an angle $\phi k=((2\pi/\lambda)*d_k*\sin(\theta))-((2\pi/\lambda)*d_{k-1}*\sin(\theta))$. When the distance between the antennas are same and equal, d, then: $d_k=K*d$ and $d_{k-1}=(k-1)*d$. Accordingly, the angle $\phi k=(2\pi/\lambda)*d*\sin(\theta)$ for all antennas. Accordingly, the range of k for steering the beam over the FoV shall be equal to ($\theta_f-\theta_i$), i.e the FoV. Similarly when the distance between the antennas are not equal, the angle $\phi k=(2\pi/\lambda)*(d+\lambda)*\sin(\theta)$, in that $\Delta$ representing the a value $d_k-d_{k-1}$. Thus, each phase shifter range may be substantially equal to the FoV. As a result, the phase shifter 410A-410N may operate even when the number of antennas in the array is large without sacrificing the resolution. Alternatively, when the number of antennas is fewer, the phase shifter 410A-410N may be implemented with lesser number of bits.

In one embodiment, each phase shifter 410A-410N is implemented with 4 bit to provide a resolution of FoV/16. Similarly, in another embodiment each phase shifter 440A-440N is implemented with 5 bit to provide a resolution of FoV/32.

It may be noted that, the conventional phase shifter provides a beam resolution of $360/2^n$ (n=number of bits). The phase shifter in the present disclosures is able to change this dependency to $FoV/2^n$. For example, a system with an FoV of 90 deg, the present phase shifter gives a resolution advantage of 4. Further, since max FoV achievable by planar array is less than 180 deg, the proposed scheme gives at least 2× advantage over the conventional phase shifter.

Figure 5:
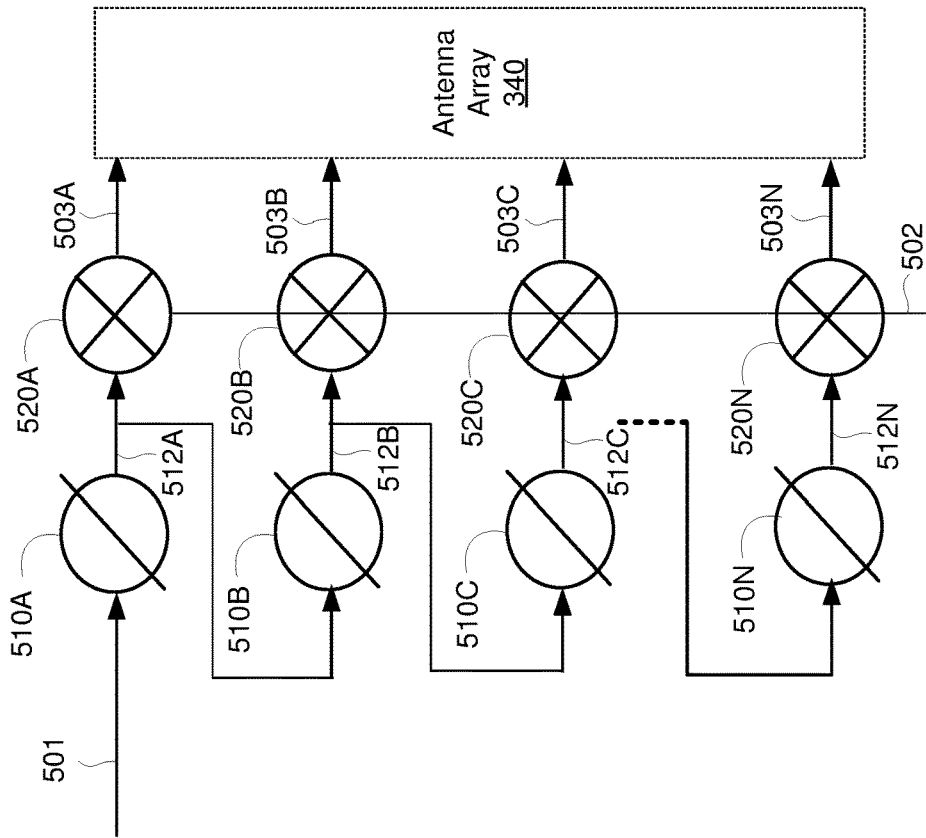
FIG. 5 is block diagram illustrating the manner in which the phase shifter 330 may be implemented in an alternative embodiment.

FIG. 5 is block diagram illustrating the manner in which the phase shifter 330 may be implemented in an alternative embodiment. The block diagram is shown comprising phase shifters 510A through 510N, and the mixers 520A through 520N. The signal 501 represents a signal required to be transmitted on the antenna array 340. Signal 502 represent a local oscillator reference signal. The phase shifter 510A-510N respectively provides phase shifted versions of the reference signal 501. The phase shifters 510A-510N are cascaded to provide output of one phase shifter to input of the following phase shifter. Each phase shifter 510A through 510N provides output respectively on path 512A-512N that versions of the reference signal 502 phase shifted by angles $\phi_1, \phi_2, \phi_3, \ldots \phi_n$.

The mixers 520A through 520N respectively mixes the phase shifted reference signals 512A-512N with the signal 501. Due to mixer operation, the signal 501 is translated to the reference frequency while translated signals 503A-503N are respectively phase shifted by angles $\phi_1, \phi_2, \phi_3, \ldots \phi_n$. The translated signals 503A-503N may be provided to the antenna array 340 for transmission. As a result, the carrier or reference signal that does not carry information is subjected to the cascading phase shift operation there by reducing the effect of attenuation due to cascade arrangement on the signal 501.

Figure 6:
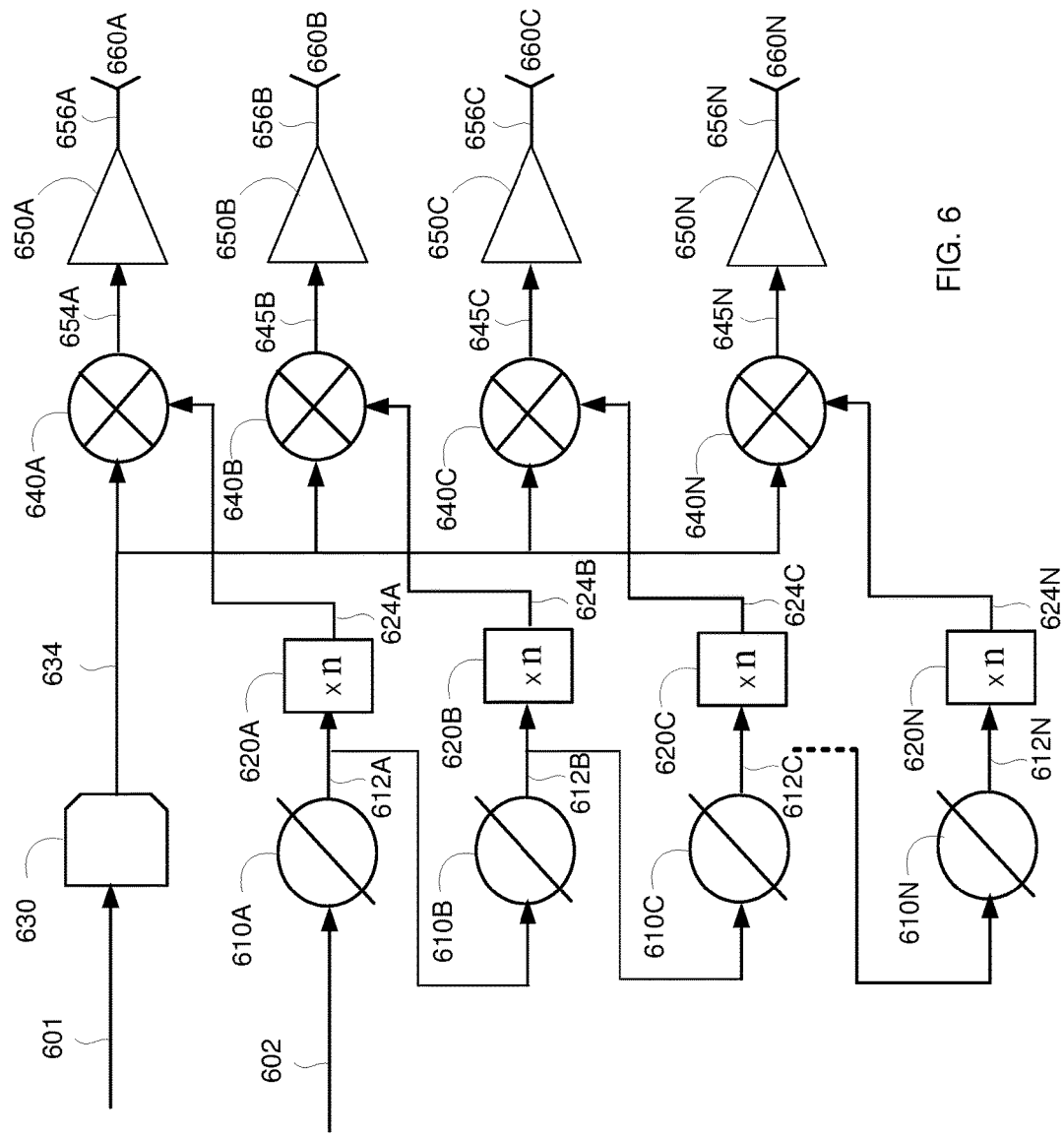
FIG. 6 is a block diagram of an integrated circuit operative to steer the beam in one embodiment.

FIG. 6 is a block diagram of an integrated circuit operative to steer the beam in one embodiment. The integrated circuit is shown comprising the cascaded phase shifter 610A-610N, the multiplier 620A-620N, digital to analog convertor (DAC) 630, mixers 640A-640N, power amplifier 650A-650N, antenna array 660A-660N. Each element is described in further detail below.

The cascaded phase shifter 610A-610N receives local oscillator reference signal and generates N phase shifted version of the local oscillator reference signal. In one embodiment, the local oscillator frequency is set to a value that is a fraction of the frequency of the RF signal transmitted on the antenna array 660A-660N. For example, when the antenna array is set to transmit a RF signal centered at frequency $f_{RF}$, then the local oscillator frequency is set to $f_{RF}/N$. In that, N taking an integer value.

The phase shifter 610A-610N generates N local oscillator reference signals that are phase shifted by angle $\phi_1, \phi_2, \phi_3, \ldots \phi_n$, respectively. In one embodiment, each phase shifter is set to provide a phase shift $\phi$ based on the control bits. The beam steering controller 320 may provide the control bit representing the angle $\phi$ that is within the range FoV. For example, the beam steering controller 320 may provide a four-bit control signals where in 0000 may steer the beam to one extreme value ($\phi_i$), while 1111 may represent another extreme value ($\phi_f$).

In one embodiment the phase shifters 610A-610N are implemented in analog domain where in each phase shifter may be implemented as inductor (L), capacitor (C) and resistor delay line. Where in the control bits adjust value of the L, C and R to obtain the desired phase shift or delay. Alternatively, the phase shifter 610A-610N may be implemented in digital domain. In that the digital phase shifted signal may be converted to analog by a DAC (not shown). The N local oscillator reference signals that are phase shifted by angle $\phi_1, \phi_2, \phi_3, \ldots \phi_n$, are provided on path 612A-612N.

The multipliers 620A-620N multiplies the frequency of the N local oscillator reference signals that are phase shifted by angle $\phi_1, \phi_2, \phi_3, \ldots \phi_n$ received on path 612A-612N by a factor "n" to provide a N number of reference signal in RF frequency that are phase shifted by angle $n\phi_1, n\phi_2, n\phi_3, \ldots n\phi_n$. The N number of reference signals in RF frequency is provided on path 624A-624N. The (frequency) multiplier 620A-620N may be implemented in any known way. The DAC 630 converts the base band signal carrying information (intended for transmission) to analog form. In one embodiment, the base band signal may be received from signal source 310. For example, the base band signal may comprise radar signature signal for object detection. The base band analog signal is provided on path 634.

The mixers 640A-640N translates the base band analog signal 634 to N number of RF signals that are shifted in phase by angles $\phi_1, \phi_2, \phi_3, \ldots \phi_n$ respectively. The mixer 640A-640N receives the N number of reference signals in RF frequency that is provided on path 624A-624N on its one input terminal and the base band analog signal provided on path 634 on the other terminal. Thus, the base band signal on the path 634 is translated by the N number of RF signals. The translated N RF signals that are shifted in phase by angles $\phi_1, \phi_2, \phi_3, \ldots \phi_n$ are provided on the path 645A-N. The mixers 640A-640N may be implemented in any known ways.

The power amplifier 650A-650N amplifies the RF signal on paths 645A-645N to a desired power level for transmission. For example, in case radar range detection application, the desired power may be determined based on the range of the radar and the object intended to be detected. Power amplified RF signals may be provided on the respective feeder line 656A-656N to respective antenna in the antenna array 660A-660N.

Since each antenna receives 660A-660N RF signals that are relatively phase shifted by an angle $\phi_1, \phi_2, \phi_3, \ldots \phi_n$ that are set to values in relation to the distance between the antenna and the frequency of the RF signal, the antenna array 660A-660N forms a beam of steered from its normal by a value $\theta$. the beam steering controller may provide a different control signal to change the value $\theta$.

While various embodiments of the present disclosure have been described above, it should be understood that they have been presented by way of example only, and not limitation. Thus, the breadth and scope of the present disclosure should not be limited by any of the above-discussed embodiments, but should be defined only in accordance with the following claims and their equivalents.

What is claimed is:

1. A radio frequency (RF) radiation beam steering device comprising:

A set of phase shifters, each providing a phase shift value that is same a same value, connected such that an output of one phase shifter feeds an input of an other phase shifter, in that a first signal is cascaded through the set of phase shifters to generate a corresponding set of phase shifted signals;

a set of mixers to translate the first set of phase shifted signals to an RF center frequency; and an array of antennas forming the RF radiation beam, wherein the set of phase shifted signals are coupled to the respective one of antenna in the array of antennas so as to steer the RF radiation beam in accordance with the phase shift.

2. The RF radiation beam steering device of claim 1, wherein the first signal is a reference local oscillator signal with a first base band frequency.

3. The RF radiation beam steering device of claim 2, further comprising:

a set of multipliers multiplying the corresponding ones of the set of phase shifted signals by a first factor to generate a first set of phase shifted RF signals; and a set of mixers mixing a first base band signal carrying an information with each in the first set of phase shifted RF signals to form a second set of phase shifted RF signals carrying the information.

4. The RF radiation beam steering device of claim 1, wherein when a distance between the antennas in the antenna array is uniform, the phase shift is set to a value $\Phi$ as: $(2\pi/\lambda)*d*\sin(\Theta)$, in that $\Theta$ representing an angle made by the RF radiation beam, d representing a uniform distance between the antennas in the array, $\lambda$ representing the wavelength of the first set of phase shifted signal.

5. The RF radiation beam steering device of claim 4, wherein when the distance between the antennas in the antenna array is non uniform, the phase shift is set to a value $\Phi$ as: $(2\pi/\lambda)*(d+\Delta)*\sin(\Theta)$, $d+\Delta$ representing a non-uniform distance between the antennas in the antenna array.

6. The RF radiation beam steering device of claim 5, further comprising a controller determining the value $\Phi$ and setting the phase shift to the value $\Phi$.

7. The RF radiation beam steering device of claim 3, wherein the set of phase shifters are deployed in the analog domain.

\* \* \* \* \*